United States Patent [19]

Brown

[11] 4,010,015
[45] Mar. 1, 1977

[54] INDUSTRIAL VACUUM CLEANER

[75] Inventor: Forrest W. Brown, Dover, Ohio

[73] Assignee: Invincible Vacuum Corporation, Dover, Ohio

[22] Filed: Jan. 30, 1976

[21] Appl. No.: 653,770

[52] U.S. Cl. .................................. 55/335; 15/340; 15/327 E; 15/353; 55/378; 55/472; 55/429

[51] Int. Cl.² .................................. B01D 50/00

[58] Field of Search ............ 55/378, 369, 334, 373, 55/337, 335, 435, 429, 467, 472; 15/340, 353, 327 R, 327 D, 327 E

[56] References Cited

UNITED STATES PATENTS

| 956,450 | 4/1910 | Thurman | 55/374 |
|---|---|---|---|
| 2,496,180 | 1/1950 | Smith et al. | 55/472 |
| 2,863,525 | 12/1958 | Lucian | 55/435 |
| 3,910,781 | 10/1975 | Bryant, Jr. | 55/429 |

Primary Examiner—Bernard Nozick
Attorney, Agent, or Firm—Buell, Blenko & Ziesenheim

[57] ABSTRACT

The open end of a dust bag in an upright tank type vacuum cleaner is detachably fastened to a frame fitting within and against the upper face of a ledge in the tank. A deflector skirt spaced from the tank wall is fitted against the lower face of the ledge and the frame and skirt are held against the ledge from opposite sides by spring catches mounted on the inside surface of the deflector skirt and engaging the frame. Those catches are accessible from the bottom of the deflector skirt when the dump bucket forming the bottom portion of the tank is removed.

5 Claims, 5 Drawing Figures

INDUSTRIAL VACUUM CLEANER

This invention relates to improvements in Industrial Vacuum Cleaners. It is more particularly concerned with vertical tank type cleaners having a replaceable dust bag in the upper portion of the tank.

Industrial vacuum cleaners, because of their weight, are usually mounted on a wheeled frame. Many such cleaners are of the vertical tank type in which a motor driven suction fan, sometimes mounted outside the tank, draws air into the lower portion of the tank and exhausts it from the upper portion of the tank through a dust bag arrangement of some sort disposed within the tank. The larger particles of dirt fall into the lower portion of the tank, which is detachable from the upper portion so that it may be emptied.

The dust bag, of course, must be changed from time to time. In order to decrease the frequency of bag change rather complicated configurations of the bag material are resorted to in order to increase the bag area through which the dust-laden air is drawn. Dust bags looped and relooped over frame assemblies can provide several layers of bag material in the path of the dirt. The open end of the bag must be fastened to a ring or other frame so as to seal the filter to the tank somewhere within the tank, and this fastening must be readily accessible to facilitate bag changes.

It is the principal object of my invention to provide vacuum cleaner apparatus having readily accessible bag end fastening means for a multiple fold dust bag filter in a tank type cleaner. Other objects of my invention will appear from the description thereof which follows.

In my apparatus to be described, the open end of the dust bag is fastened to a frame positioned within the tank, which frame is ring-shaped in cleaners with cylindrical tanks. That frame fits against a ledge which projects inwardly from the wall of the upper portion of the tank. A deflector skirt which is spaced from the tank wall fits against the underside of that ledge and is fastened to the frame by spring catches affixed to the inner wall of the deflector skirt. Those catches are accessible when the lower tank portion is removed for emptying. When the catches are released, the dust bag can be removed from the top of the upper tank portion.

An embodiment of my invention presently preferred by me is illustrated in the attached figures, to which reference is now made:

Figure 1:
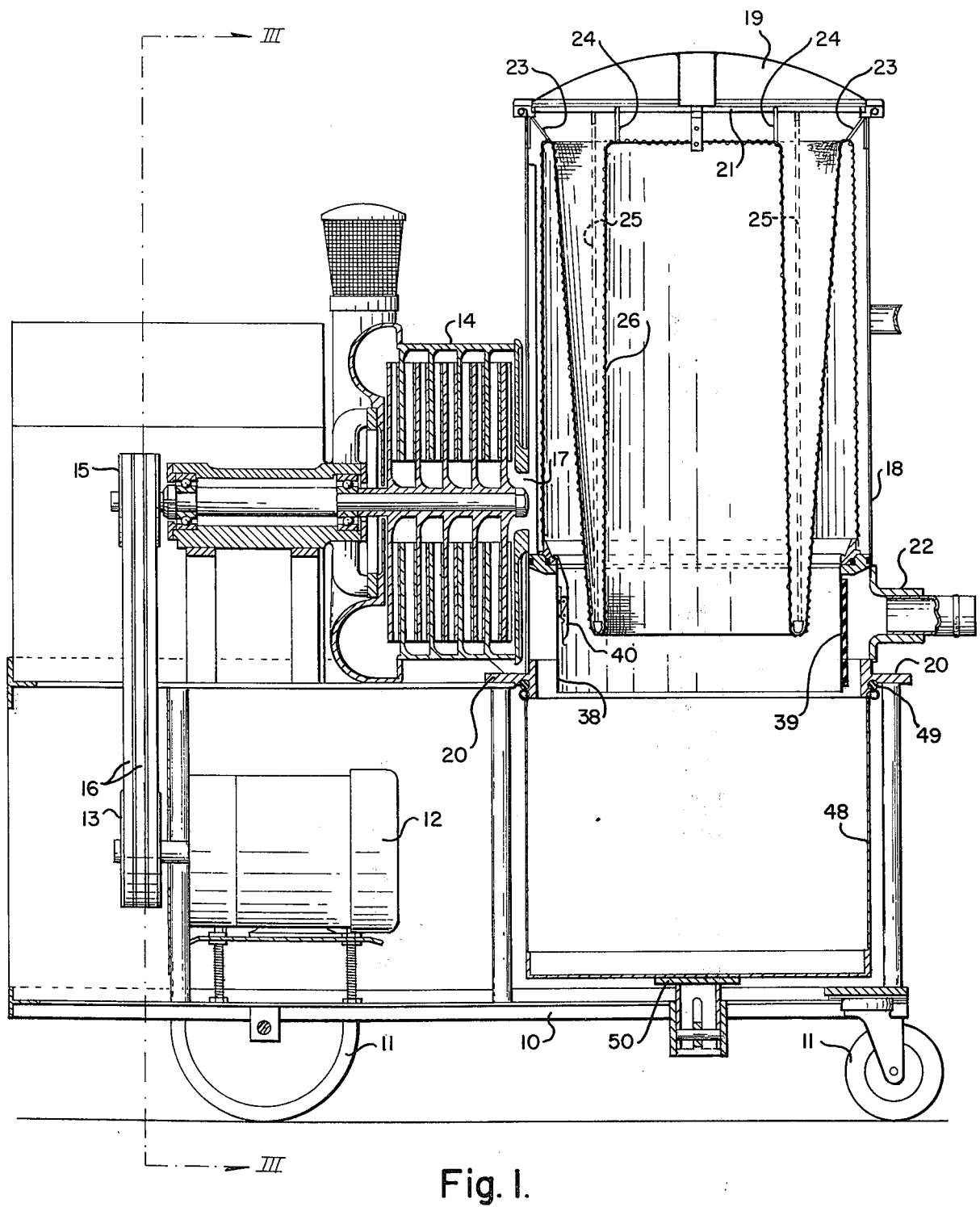
FIG. 1 is an elevation, partly in cross section, of my apparatus.
Figure 2:
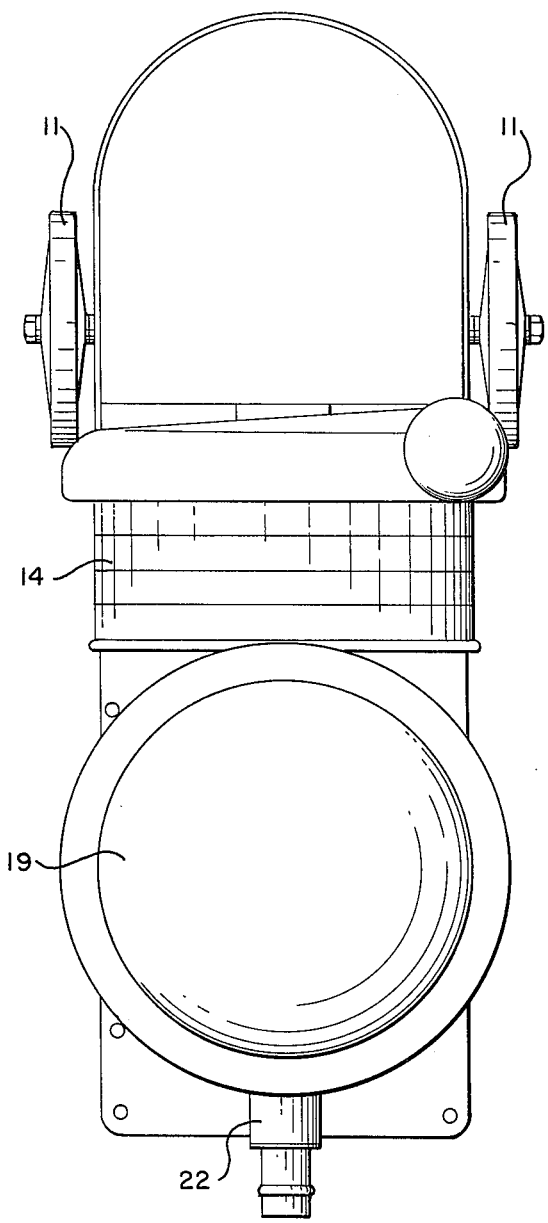
FIG. 2 is a plan of the apparatus of FIG. 1.

My apparatus is mounted on a framework 10 provided with wheels 11. A motor 12 mounted on frame 10 is fitted with a V belt sheave 13. Above motor 12 is mounted a rotary suction blower 14, the shaft of which is fitted with a V belt sheave 15 positioned in line with the motor sheave 13. Motor 12 drives blower 14 by means of V belts 16 trained around sheaves 13 and 15.

The axial intake 17 of suction blower 14 opens through the wall of upright cylindrical upper tank 18. The top of upper tank 18 is closed by a removable lid 19. The lower open end of upper tank 18 is fastened to an exterior ring 20 which is rigidly attached to frame 10. In the wall of upper tank 18 immediately adjacent its lower end is an inlet 22 to which the suction pick-up hose is attached when the apparatus is in use.

Attached to an open support 21 held in place on tank 18 under lid 19 are peripheral suspension elements 23 disposed around its circumference and central suspension elements 24 disposed intermediate the lid edge and center. A cylindrical screen structure 25 is also attached to support 21 coaxially therewith intermediate peripheral suspension elements 23 and central suspension elements 24, and extends downwardly to a level about that of air inlet 22. A dust bag 26 is held in place by the suspension elements above mentioned and screen 25. The central portion of the bottom of bag 26 is suspended a short distance below lid 19 by center suspension elements 24. The bag side walls depend within the screen 25 and are folded around the bottom edge of that screen and drawn upwardly again to peripheral suspension elements 23, from which the bag wall again depends adjacent the side wall of tank 18.

Figures 4, 5:
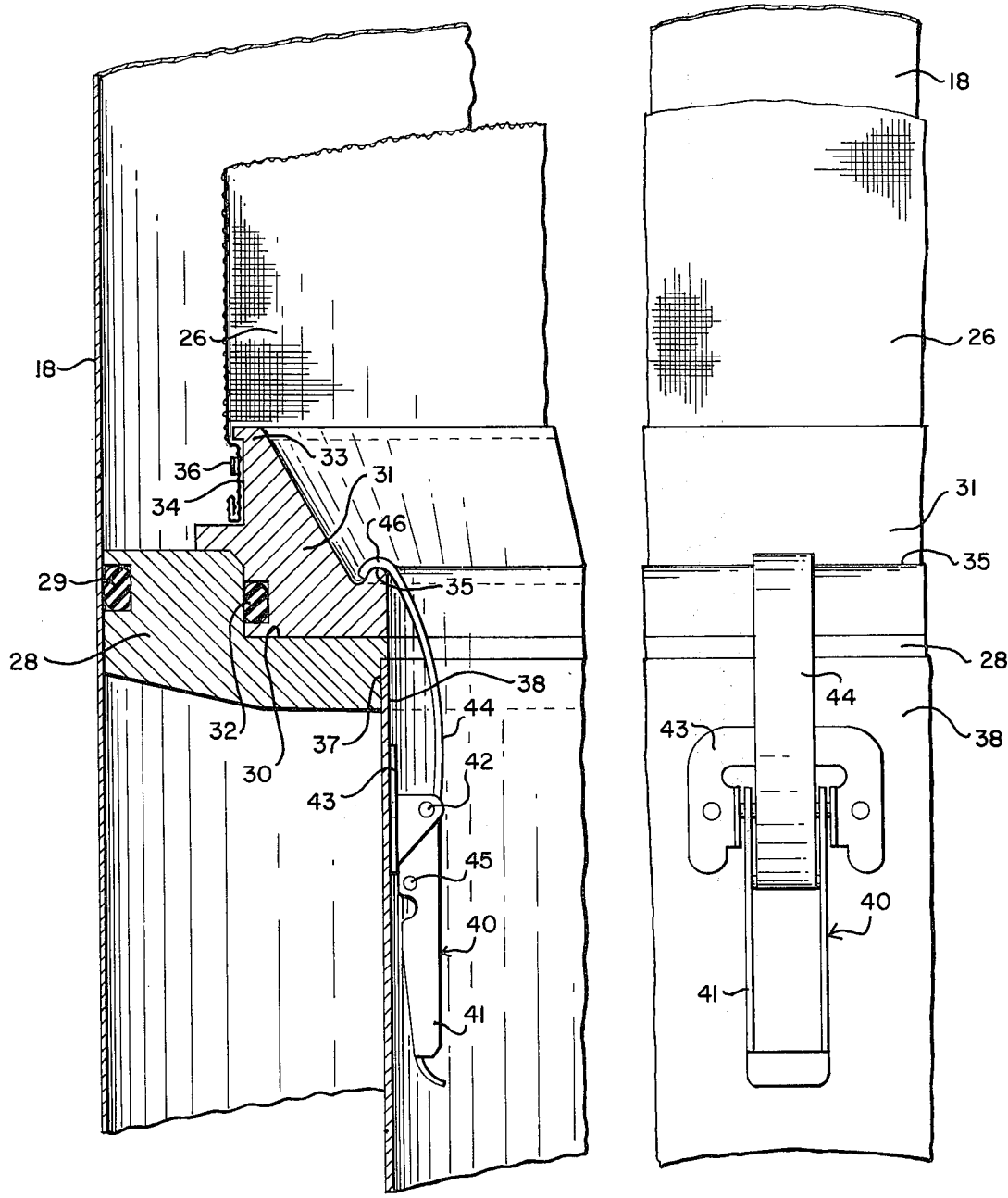

Around the inside of tank 18, immediately above air inlet 22 is fixed a horizontal ledge 28 (FIG. 4). That ledge is sealed to the wall of tank 18 by an O-ring 29 fitted in a recess in the outer edge of that ledge. The upper surface of ledge 28 is cut away to form an inwardly and upwardly opening peripheral recess 30. A circular frame 31 is detachably fitted within the recess 30 with its inner surface flush with the inner surface of ledge 28 and sealed to ledge 28 by an O-ring 32 recessed in the outer surface of frame 31. That frame is formed with an upper rim 33 around its outer edge which projects above ledge 28 and has a slightly recessed flat bottom groove 34 surrounding it. The open bottom of dust bag 26 is dimensioned to fit over rim 33 and is secured thereto by a strap 36 in groove 34. The inner edge of frame 31 is formed with an upwardly projecting bead 35.

The lower surface of ledge 28 is cut away to form an inwardly and downwardly opening peripheral recess 37. In this recess is fitted a cylindrical deflector skirt 38 which extends downwardly to a level below inlet 22 and approximately that of the open lower end of tank 18. Deflector skirt 38 is spaced from inlet 22 and its outer surface opposite inlet 22 is protected with a rubber pad or baffle 39 to receive the impact of dirt particles sucked into tank 18 through inlet 22. Deflector skirt 38 may be fixed to ledge 28, but, as will appear, it need not be so fixed.

Around the inside surface of deflector skirt 38 is disposed a plurality of spring catches 40. Those catches are of a known type having a trigger arm 41 mounted on pivot 42 in mounting plate 43 and an elongated spring member 44 mounted on parallel pivot 45 in trigger arm 41, extending away from arm 41 over pivot 42 and terminating in a hooked end portion 46. In the closed position of catch 40 illustrated, that hooked end 46 hooks over bead 35 of frame 31, so holding deflector skirt 38 and frame 31 against ledge 28 from opposite sides.

Figure 3:
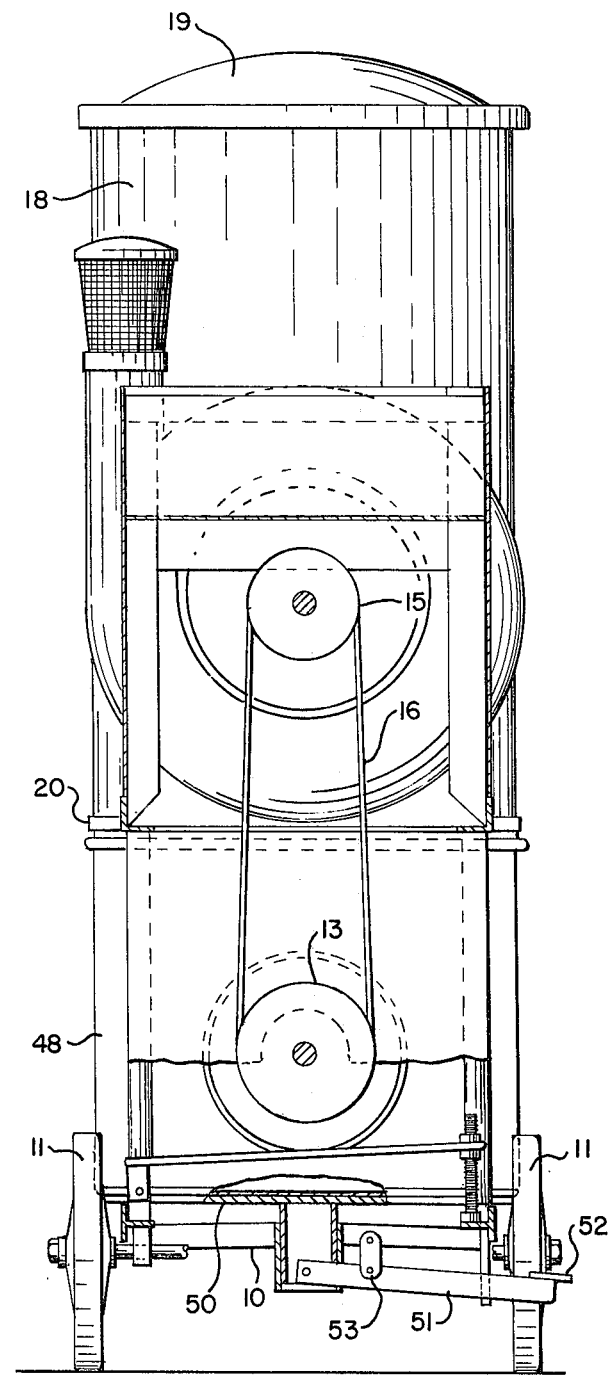
FIG. 3 is a cross section, partly broken away, of the apparatus of FIG. 1, taken on the plane III—III of FIG. 1, and FIGS. 4 and 5 are enlarged details of the apparatus of FIG. 1.

A dump bucket 48 is dimensioned so that its open end fits against a gasket 49 in the lower surface of exterior ring 20. The bottom of bucket 48 rests on plate 50 which is supported by the inner end of lever arm 51 mounted crossways of frame 10 so that its outer end extends beyond frame 10 and terminates in a foot pedal 52 (FIG. 3). Arm 51 is pivoted from frame 10 at a point 53 intermediate its ends so that pressure on pedal 52 raises plate 50 and dump bucket 48 against gasket 49. A conventional catch, not shown, is provided to hold lever arm 51 in that position. Conversely, when pedal 52 is allowed to rise, dump bucket 48 falls of its own weight so that it clears ring 20 and can be removed from frame 10 by pulling it out transversely thereof.

The cleaning operation of a vacuum cleaner embodying my invention does not differ from that of similar prior art vacuum cleaners. The changing of the dust bag 26 is, however, considerably simplified. Lever arm 51 is operated to lower dump bucket 48 and it is then pulled out from frame 10 as above mentioned, leaving the open end of deflector skirt 38 accessible. A worker then reaches up inside deflector skirt 38 and releases the several catches 40 by raising their trigger arms 41. That action relieves the tension on spring member 44, raises its hooked end 46 above bead 35, and allows spring member 44 to move inwardly away from frame 31. The cover 19 of upper tank 18 is then removed, and support 21 is lifted out, lifting with it dust bag 26 and its attached frame 31. Dust bag 26 is then replaced in the open by a new bag, and the cleaner is reassembled by carrying out the operations previously mentioned, but in reverse sequence.

In the foregoing specification I have described a presently preferred embodiment of my invention; however, it will be understood that my invention can be otherwise embodied within the scope of the following claims.

I claim:

1. In a vacuum cleaner comprising a closed upper end upper tank portion, suction-producing means connected thereto, a removable closed lower end lower tank portion, means for bringing the lower tank portion into sealing contact at its upper end with the lower end of the upper tank portion and for moving it away therefrom, an air inlet and means for holding an inverted dust bag filter in the upper tank portion with the open end of the bag downward, the improvement comprising an interior ledge surrounded by the upper tank portion intermediate its upper and lower ends, a frame adapted to fit and positioned against the upper surface of the ledge and to seal against that ledge, the frame projecting above that ledge, means to attach the open end of a dust bag to the upright projecting frame portion, a deflector skirt adapted to fit and positioned against a lower surface of the ledge, the skirt projecting below the ledge to the lower end of the upper tank portion and spaced from the upper tank portion wall, the air inlet being positioned in the upper tank portion wall between its lower end and the interior ledge and opening into the lower tank portion in the space between the upper tank portion wall and the deflector skirt, whereby air may flow from the air inlet into the deflector skirt, and a plurality of means detachably connecting the deflector skirt to the frame operable from inside the deflector skirt.

2. The apparatus of claim 1 in which the upper surface of the ledge is recessed and the frame fits into that recess.

3. The apparatus of claim 1 in which the lower surface of the ledge is recessed and the deflector skirt fits into that recess.

4. The apparatus of claim 1 in which the means detachably connecting the deflector skirt to the frame are spring catches pivotally affixed to the inside surface of the deflector skirt and which hook over the inside edges of the frame.

5. The apparatus of claim 4 in which the inside edges of the frame form a raised peripheral bead.

* * * * *